US012688185B1

(12) United States Patent
Markovitz et al.

(10) Patent No.: US 12,688,185 B1
(45) Date of Patent: Jul. 21, 2026

(54) DYNAMIC GRAPH MEMORY FOR AGENTS

(71) Applicant: INTUIT INC., Mountain View, CA (US)

(72) Inventors: Gad Markovitz, Tel Aviv (IL); Hadas Baumer, Tel Aviv (IL); Ofir Ben Shoham, Tel Aviv (IL); Amir Bialer, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/369,007

(22) Filed: Oct. 24, 2025

(51) Int. Cl.
*G06F 16/245* (2019.01)
*G06F 16/248* (2019.01)
*G06F 16/28* (2019.01)

(52) U.S. Cl.
CPC .......... *G06F 16/245* (2019.01); *G06F 16/248* (2019.01); *G06F 16/288* (2019.01)

(58) Field of Classification Search
CPC . G06F 16/243; G06F 16/24522; G06F 16/288
USPC .......................................................... 707/706
See application file for complete search history.

(56) References Cited

U.S. PATENT DOCUMENTS

| | | | |
|---|---|---|---|
| 2024/0419918 A1* | 12/2024 | Vangala | ............ G06F 16/90332 |
| 2025/0036375 A1* | 1/2025 | Hsieh | ......................... G06F 8/35 |
| 2025/0208844 A1* | 6/2025 | Yu | ........................... G06N 5/022 |
| 2025/0328342 A1* | 10/2025 | Koufou | ..................... G06F 8/71 |

* cited by examiner

*Primary Examiner* — Hung T Vy
(74) *Attorney, Agent, or Firm* — DLA PIPER LLP US

(57) ABSTRACT

A large language model (LLM) can receive input data and process the input data. The processing can include generating a response to the input data, generating a first memory entry corresponding to the input data, generating a second memory entry corresponding to the response, and generating a relationship between the first memory entry and the second memory entry. Memory entries and relationships can be stored in a graph memory structure. Processing can include accessing the graph memory structure, searching the graph memory structure for information associated with at least a portion of the input data and obtaining a search result comprising at least one of the at least two nodes and the at least one edge, and generating a response to the input data.

16 Claims, 5 Drawing Sheets

300

200

300

302 – receive input data

304 – generate response using LLM

306 – generate first memory entry corresponding to input data

308 – generate second memory entry corresponding to response

310 – generate relationship between first and second memory entries

312 – store memory entries and relationship in graph memory structure

400

402 – receive input data

404 – access graph memory structure

406 – search graph memory structure

408 – generate response incorporating search results

DYNAMIC GRAPH MEMORY FOR AGENTS

BACKGROUND

Modern large language model (LLM)-based autonomous agents face significant challenges in handling complex, multi-step tasks due to inherent limitations in their memory and reasoning capabilities. Typically, these agents depend on linear conversation histories or fixed-size context windows, leading to issues such as losing critical details over time, becoming incoherent by failing to explicitly track intermediate reasoning steps (like subgoals, hypotheses, and their causal relationships), and struggling with effective planning and external tool usage. Additionally, when reasoning paths fail or conditions change, agents find it difficult to adapt or backtrack due to the absence of a clear representation of prior decision points, resulting in repeated mistakes or stalled progress. As tasks grow in complexity, traditional memory structures also become overwhelmed, preventing agents from selectively focusing on relevant information and efficiently forgetting irrelevant details.

BRIEF DESCRIPTIONS OF THE DRAWINGS

DETAILED DESCRIPTION OF SEVERAL EMBODIMENTS

Systems and methods described herein can use a short-term, structured knowledge graph as working memory for LLM-based autonomous agents. Instead of relying solely on linear or fixed-context memories, the agent can dynamically construct and maintain a graph comprising nodes, representing observations, hypotheses, subgoals, and tool outputs, interconnected by edges capturing relationships such as causality, dependency, temporal order, or contradiction. An LLM can continuously parse incoming information, utilizing its internal reasoning and predefined logical rules. This graph-based structure may allow the agent to efficiently organize and access relevant context, adaptively update its reasoning based on new information, and effectively manage tasks by explicitly tracking relationships and decision paths. By integrating seamlessly into the agent's decision-making process, the systems and methods described herein may improve coherence, tool use efficiency, planning, and the agent's ability to dynamically adapt and respond to changing information throughout a task session.

Figure 1:
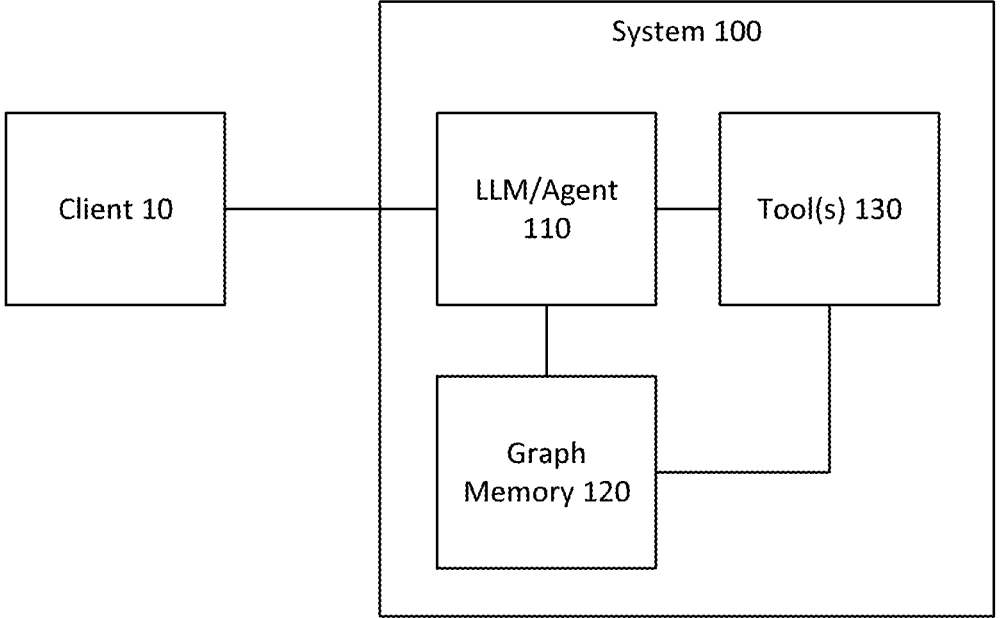
FIG. 1 shows an example agent and dynamic graph memory system according to some embodiments of the disclosure.

FIG. 1 shows an example agent and dynamic graph memory system 100 according to some embodiments of the disclosure. System 100 may include one or more modules such as LLM (or agent) 110, graph memory 120, and/or tool(s) 130. System 100 may be in communication with client 10, for example through one or more networks such as the Internet. System 100 can provide a chat UI accessible by client 10, enabling a user of client 10 to interact with LLM 110. The elements of system 100 are described in greater detail below with respect to FIGS. 2-4, but in general, a user of client 10 can send inputs to LLM 110 (e.g., in a chat conversation), and LLM 110 and/or tool(s) 130 invoked by LLM 110 can maintain a record of the inputs using graph memory 120. When LLM 110 references the record, LLM 110 and/or tool(s) 130 can query graph memory 120.

Graph memory 120 may be stored in non-transitory computer-readable medium. Graph memory 120 may have a structure comprising at least two nodes and at least one edge linking the at least two nodes, at least a first one of the at least two nodes corresponding to input data received by LLM 110, at least a second one of the at least two nodes corresponding to a response to the input data generated by LLM 110, and the at least one edge corresponding to a relationship between the at least two nodes. Graph memory 120 may be configured so that at least one new node may be added to the graph memory structure in response to a command generated by LLM 110 and received at graph memory 120 and/or at least one new edge may be added to the graph memory structure linking the at least one new node to another node of the at least two previously-existing nodes. Graph memory 120 may be configured to receive a search command from LLM 120, perform a search of the graph memory structure in response to the search command, and send a search result to LLM 120.

Illustrated components may include a variety of hardware, firmware, and/or software components that may interact with one another. Some components shown in FIG. 1 may communicate with one another using networks. For example, system 100 may communicate with one or more clients 10 through one or more networks (e.g., the Internet, an intranet, and/or one or more networks that provide a cloud environment). In some embodiments, elements of system 100 may communicate with one another through the one or more networks. Each component may be implemented by one or more computers (e.g., as described below with respect to FIG. 5).

Elements illustrated in FIG. 1 (e.g., system 100 (including LLM 110, graph memory 120, and tool(s) 130) and client 10 are each depicted as single blocks for ease of illustration, but those of ordinary skill in the art will appreciate that these may be embodied in different forms for different implementations. For example, while separate modules of system 100 are depicted separately, any combination of these elements may be part of a combined hardware, firmware, and/or software element. Moreover, while the modules are depicted as parts of a single system 100 element, any combination of these elements may be distributed among multiple logical and/or physical locations. Also, while one client 10, one system 100, one LLM 110, one graph memory 120, and one tool 130 are illustrated, this is for clarity only, and multiples of any of the above elements may be present. In practice, there may be single instances or multiples of any of the illustrated elements, and/or these elements may be combined or co-located. For example, a plurality of clients 10 may interact with system 100.

In the following descriptions of how the illustrated components function, several examples are presented. However, those of ordinary skill in the art will appreciate that these examples are merely for illustration, and the disclosed embodiments are extendable to other application and data contexts.

Figure 2:
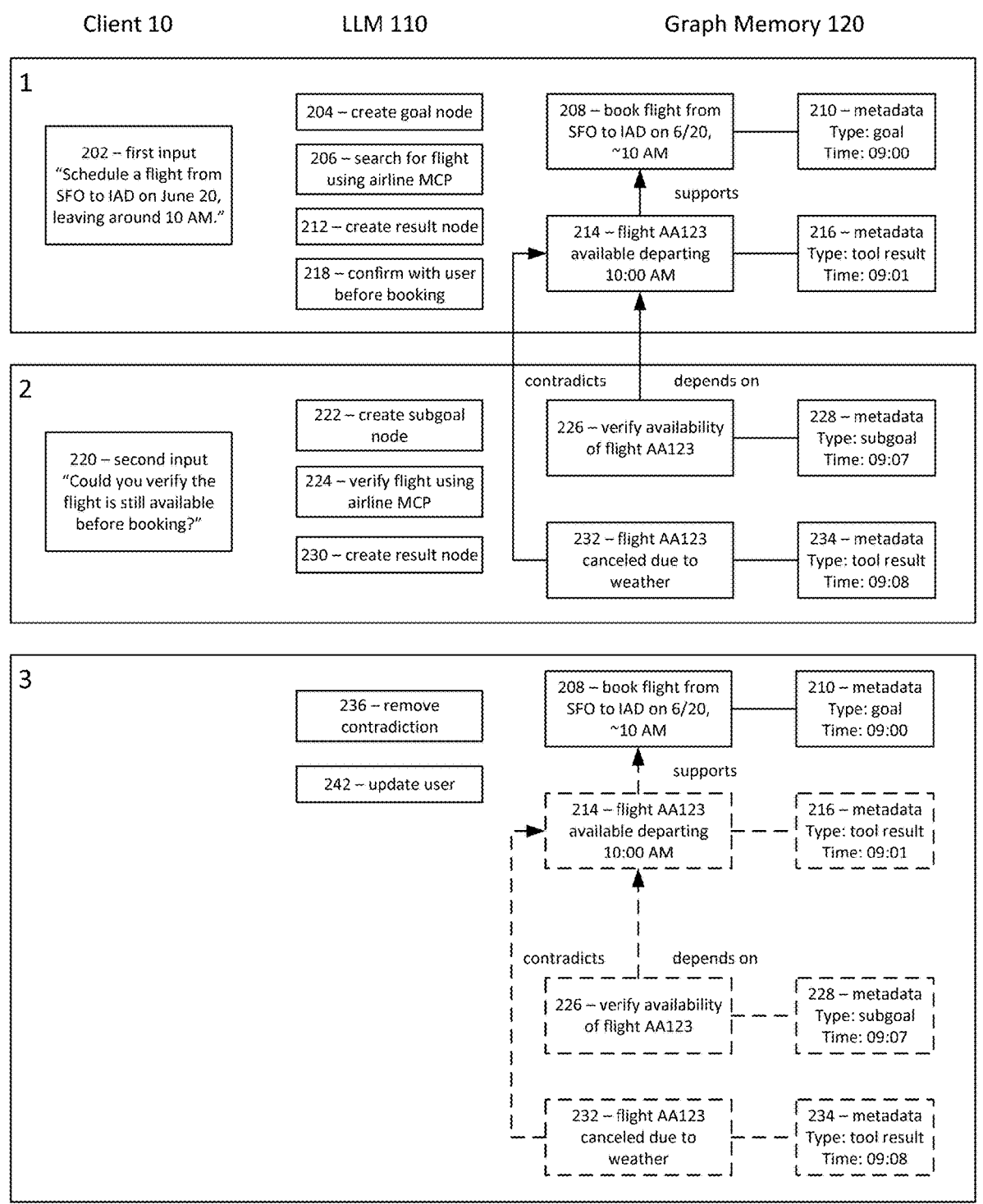
FIG. 2 shows an example agent interaction with dynamic graph memory according to some embodiments of the disclosure.

FIG. 2 shows an example agent interaction 200 with dynamic graph memory according to some embodiments of the disclosure. In this example, client 10 sends inputs to LLM 110, and LLM 110 uses graph memory 120 when processing the inputs. Interaction 200 shows actions by client 10 in the left column, actions by LLM 110 in the center, and actions in graph memory 120 on the right. In the illustrated example, inputs at client 10 trigger processing by LLM 110, which in turn can access and/or modify graph memory 120 data.

At 202, client 10 can send a first input, received by user input to a UI for example, to LLM 110. In FIG. 2, the input is, or can include, "Schedule a flight from SFO to IAD on June 20, leaving around 10 AM." The quoted portion may be the user input into the UI, although it should be understood that client 10 can also include metadata and/or client prompt data along with the user's input.

At 204, LLM 110 can receive the first input and create a goal node 208 in graph memory 120. As described in detail below, LLM 110 can use data in the system prompt and/or invoke one or more tools 130 to create the goal node 208. In the example of FIG. 2, the goal node 208 includes "book flight from SFO to IAD on 6/20, ~10 AM." Graph memory 120 may associate metadata 210 with goal node 208, for example indicating a node type of "goal" and a node creation time of "09:00."

In addition to creating the goal node 208, LLM 110 can perform processing 206 requested by the user input 202, for example searching for a flight using one or more airline application programming interface (API) calls and/or one or more airline model context protocol (MCP) calls. LLM 110 can perform processing 212 to create a result node 214 representing processing 206 and an edge ("supports") linking result node 214 and goal node 208. As described in detail below, LLM 110 can use data in the system prompt and/or invoke one or more tools 130 to create the result node 214 and the edge. In the example of FIG. 2, the result node 214 includes "flight AA123 available starting 10:00 AM." Graph memory 120 may associate metadata 216 with result node 214, for example indicating a node type of "tool result" and a node creation time of "09:01."

At 218, LLM 110 can reply to the user by sending a response to client 10, for example showing the flight information for the identified flight (AA123) to the user and asking the user to confirm before the LLM 110 attempts to book the flight. Instructions to respond with the identified flight information and to request confirmation can be included within LLM 110 system prompt(s), for example.

At 220, client 10 can send a second input, received by user input to a UI for example, to LLM 110. For example, client 10 can display the response generated at 218, and the user can enter a reply to the response as the second input. In FIG. 2, the input is, or can include, "Could you verify the flight is still available before booking?" The quoted portion may be the user input into the UI, although it should be understood that client 10 can also include metadata and/or client prompt data along with the user's input.

At 222, LLM 110 can receive the second input and create a subgoal node 226 in graph memory 120 and an edge ("depends on") linking subgoal node 226 and goal node 208. As described in detail below, LLM 110 can use data in the system prompt and/or invoke one or more tools 130 to create the subgoal node 226 and edge. In the example of FIG. 2, the subgoal node 226 includes "verify availability of flight AA123." Graph memory 120 may associate metadata 228 with subgoal node 226, for example indicating a node type of "subgoal" and a node creation time of "09:07."

LLM 110 can also perform processing 224 requested by the user input 220, for example verifying flight availability by making one or more calls to the airline API and/or MCP. LLM 110 can perform processing 230 to create a result node

232 representing processing 224 and an edge ("contradicts") linking result node 232 and goal node 208. As described in detail below, LLM 110 can use data in the system prompt and/or invoke one or more tools 130 to create the result node 232 and the edge. In the example of FIG. 2, the result node 232 includes "flight AA123 canceled due to weather." Graph memory 120 may associate metadata 234 with result node 232, for example indicating a node type of "tool result" and a node creation time of "09:08."

By assembling the record of nodes, edges, and metadata in graph memory 120, LLM 110 can benefit from improved data search and retrieval and provide more cohesive responses as a conversation progresses. For example, when the user requests verification of "the flight," LLM 110 can call (e.g., by API and/or MCP call) or otherwise access graph memory 120 and search the structured data therein for the flight. The nodes, edges, and metadata in graph memory 120 may encode conversation data and relationships among each step of the conversation, so that the relevant information, and the context informing the relevant information, can be readily located and returned.

Moreover, graph memory 120 can be pruned and/or consolidated as data becomes less relevant. For example, LLM 110 can instruct such pruning and/or consolidation periodically, in response to user command, in response to some condition, and/or on some other basis. In FIG. 2, for example, LLM 110 may send instructions to graph memory 120 to remove contradictions 236 in the data structure. As noted above, result node 232 and result node 214 are connected by a contradiction edge. Thus, in response to a command to remove contradictions, graph memory 120 can remove contradictory nodes and metadata and/or other nodes dependent thereon (removal shown in dashed lines in FIG. 2). LLM 110 can update the user 242, for example sending a message indicating that flight AA123 has been canceled and/or indicating that the contradiction has been resolved.

Figure 3:
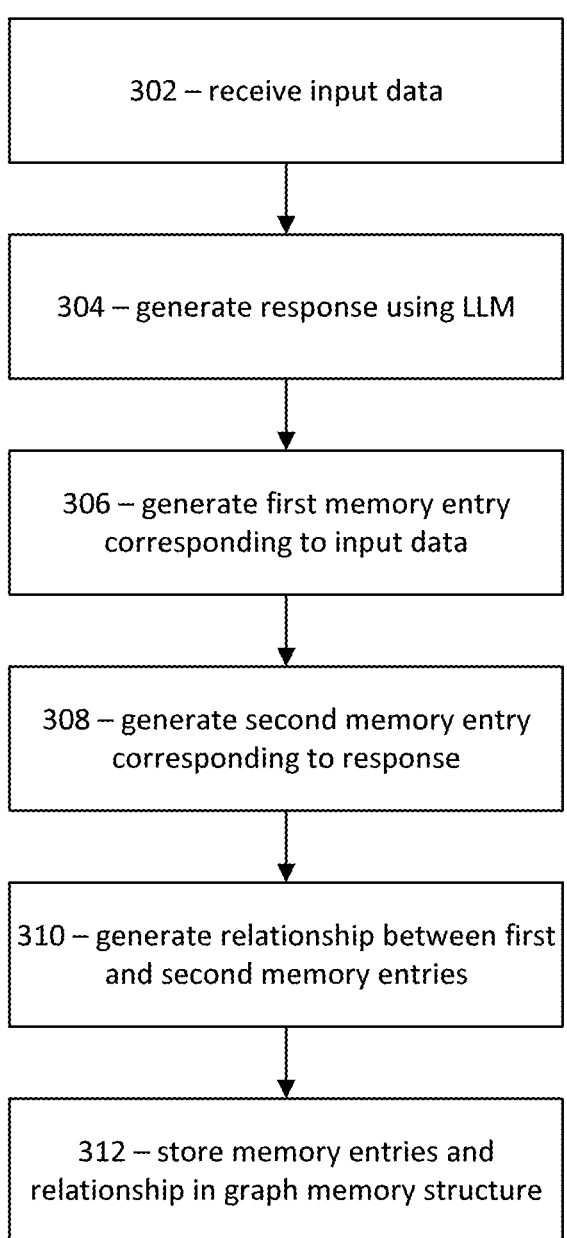
FIG. 3 shows an example dynamic graph entry generation process according to some embodiments of the disclosure.

FIG. 3 shows an example dynamic graph entry generation process 300 according to some embodiments of the disclosure. In some embodiments, system 100 may perform process 300 to generate and/or maintain a record of a user/LLM 110 conversation in graph memory 120. For example, system 100 can perform process 300 to implement graph memory 120 storage and maintenance in the example conversation of FIG. 2 and similar conversations and/or use cases.

At 302, system 100 can receive input data. For example, client 10 can present a user interface (UI) providing a field or other interface element through which a user can input data to be processed by LLM 110. In some embodiments, client 10 can provide a chat-based UI configured to receive user input data and/or data facilitating display of such a UI by client 10. Client 10 can display the UI to a user, and the user can enter data using the UI by entering text into a field, speaking into a microphone, uploading a document, and/or other options. LLM 110 can receive the user input data entered by the user through the UI.

At 304, system 100 can generate a response to the input data using LLM 110. For example, LLM 110 may take a system prompt and the user input data obtained at 302 as inputs and perform processing according to the inputs. In some cases, the data received at 302 may cause LLM 110 to reference previous interactions with the user in a conversation or prior conversation, and therefore cause LLM 110 to access graph memory 120 to formulate the answer. In such cases, system 100 may perform process 400, portions thereof, and/or similar processing. Otherwise, and/or to perform additional response generation tasks in addition to those requiring data in graph memory 120, LLM 110 may perform response generation according to its algorithm, training, and/or tuning.

At 306, system 100 can generate a first memory entry corresponding to the input data. For example, the first memory entry can include the user input data from 302, a condensed version of the user input data, a description of the user input data, a processing task performed at 304 defined by the user input data, and/or a combination of two or more of the above. The first memory entry can also include metadata describing the entry (e.g., goal, subgoal, etc.) and/or other data (e.g., time, user identifying data, etc.). An example of a first memory entry is shown in FIG. 2 as entry 208 and metadata 210 and described in detail above.

In some embodiments, LLM 110 can generate the first memory entry in response to at least one system prompt instruction. For example, the system prompt can include instructions requiring LLM 110 to create a goal node that is specific, testable, and connected to a current LLM 110 context. The system prompt can include instructions requiring LLM 110 to parse a user and/or task intent into a single primary goal and/or split auxiliary items into subgoals only if they are materially distinct. The system prompt can include instructions requiring LLM 110 to fill all metadata fields with structured short text. The system prompt can include instructions requiring LLM 110 to compute a confidence (e.g., on a given scale such as 0-1) from evidence strength (e.g., sources present, tool outputs, and/or explicit constraints) and/or ambiguity (e.g., vagueness and/or conflicts). The system prompt can include instructions requiring LLM 110 to link to upstream observations and/or results as a "derived from" edge. The system prompt can include instructions requiring LLM 110 to generate a timestamp in a specified format (e.g., ISO-8601 UTC). The system prompt can include instructions requiring LLM 110 to keep content of the node within a limit when possible (e.g., less than 280 characters). The system prompt can include instructions requiring LLM 110 to create a node using a specified format (e.g., a required JSON shape), such as the following example or another specified format:

```
{
    "id": "goal::<uuid>",
    "type": "goal",
    "title": "<short name>",
    "content": "<one-sentence statement of desired end
        state>",
    "priority": "high|medium|low",
    "status": "open|in_progress|blocked|done",
    "source": "user|planner|tool|memory",
    "derived_from": ["obs::<id>", "result::<id>"],
    "assumptions": ["<concise assumption>", " . . . "],
    "constraints": ["<hard constraint>", " . . . "],
    "confidence": 0.0,
    "timestamp": "<ISO8601>",
    "owner": "<agent or team>",
    "tags": ["goal","<domain>"]
}
```

At 308, system 100 can generate a second memory entry corresponding to the response. For example, the second memory entry can include the result of processing at 304, a condensed version of the result, a description of the result, and/or a combination of two or more of the above. The second memory entry can also include metadata describing the entry (e.g., tool result, processing result, etc.) and/or other data (e.g., time, user identifying data, etc.). An example of a second memory entry is shown in FIG. 2 as entry 214 and metadata 216 and described in detail above.

In some embodiments, LLM 110 can generate the second memory entry in response to at least one system prompt instruction. For example, the system prompt can include instructions requiring LLM 110 to create a result node in response to a tool run, API call, MCP call, and/or reasoning step yielding an outcome. The system prompt can include instructions requiring LLM 110 to summarize the outcome (e.g., in a limited sense, for example in two or fewer lines of text) and keep the raw payload separately under evidence. The system prompt can include instructions requiring LLM 110 to score outcome quality (e.g., on a given scale such as 0-1) from data freshness, completeness, consistency with constraints, and/or agreement with other nodes. The system prompt can include instructions requiring LLM 110 to link to a provenance (e.g., tool and/or inputs used to generate outcome). The system prompt can include instructions requiring LLM 110 to indicate the outcome satisfies any satisfied goal criterion with references.

The system prompt can include instructions requiring LLM 110 to generate a timestamp and/or include a confidence separate from the quality score (e.g., confidence=belief in correctness; quality=utility for the task). The system prompt can include instructions requiring LLM 110 to indicate a contradiction if the result contradicts an existing node and/or propose an edge indicating the contradiction. The system prompt can include instructions requiring LLM 110 to create a node using a specified format (e.g., a required JSON shape), such as the following example or another specified format:

```
{
    "id": "result::<uuid>",
    "type": "result",
    "title": "<short outcome name>",
    "content": "<concise outcome summary>",
    "provenance": {
    "tool": "<name or 'reasoning'>",
    "version": "<semver or commit>",
    "inputs": {" . . . ": " . . . },
    "runtime_ms": 0
    },
    "evidence": {"raw": {" . . . ": " . . . "
    "satisfies": [
    {"goal_id":"goal::<id>","criterion_metric":"<met-
        ric>","check":"pass|fail|unclear" }
    ],
    "derived_from": ["obs::<id>","result::<id>"],
    "quality_score": 0.0,
    "confidence": 0.0,
    "timestamp": "<ISO8601>",
    "notes": "<optional>",
    "flags": {"contradiction": false}
}
```

At 310, system 100 can generate a relationship between the first memory entry and the second memory entry. For example, the relationship can describe and/or define how the first memory entry and second memory entry relate to one another. Examples are shown in FIG. 2 (e.g., "supports," "contradicts," "depends on").

In some embodiments, LLM 110 can generate the relationship in response to at least one system prompt instruction. For example, the system prompt can include instructions requiring LLM 110 to maintain typed, timestamped edges among nodes to capture causal, temporal, dependency, contradiction, and/or other relationships. The system prompt can include instructions requiring LLM 110 to choose a strongest relationship first and add secondary relationships only if they add planning value. The system prompt can include instructions requiring LLM 110 to include relationship, rationale, confidence, and/or timestamp information for each relationship between nodes. The system prompt can include instructions requiring LLM 110 to set a direction for each edge/relationship, such as "forward" for cause→effect or parent→child, "backward" for supports/explains a prior assumption, and/or "undirected" for equivalence/similarity. The system prompt can include instructions requiring LLM 110 to include action hint information if the edge implies an action (e.g., requires tool use). Examples of relationship vocabulary that may be included in the system prompt may include the following: "supports": evidence/result increases belief in a node, "contradicts": conflicts on facts/constraints, "depends_on": target must exist/complete before source, "causes"/"enables": target occurs because of source, "temporal_precedes": ordering only, "refines": narrows/specializes another node, "duplicates": semantically equivalent; prefer higher-quality node, "blocked_by": impediment relationship. The system prompt can include instructions requiring LLM 110 to create a node using a specified format (e.g., a required JSON shape), such as the following example or another specified format:

```
{
    "id": "edge::<uuid>",
    "from": "<node_id>",
    "to": "<node_id>"
    "relation":
    "supportsкontradicts|depends_on|causes|
        enables|temporal_precedes|refines|
        duplicate s|blocked_by",
    "direction": "forward|backward|undirected",
    "rationale": "<one-sentence explanation>",
    "confidence": 0.0,
    "action_hint": "<optional next step if actionable>",
    "timestamp": "<ISO8601>",
}
```

At 312, system 100 can store the first memory entry, the second memory entry, and the relationship in graph memory 120. For example, LLM 110 can send the first memory entry, the second memory entry, the relationship, descriptions of one or more thereof, and/or instructions to graph memory 120. Graph memory 120 can store the first memory entry as a first node in a graph memory structure, the second memory entry as a second node in the graph memory structure, and the relationship as an edge connecting the first node and the second node in the graph memory structure.

Storing may be performed according to one or more techniques. For example, in some embodiments, LLM 110 can send at least one structured call to graph memory 120, and graph memory 120 may be configured to store at least a portion of data included in the at least one structured call according to at least one instruction in the at least one structured call. The at least one structured call may be or may include at least one of an API call and a MCP call, for example. In some embodiments, the call may invoke one or more tools (e.g., in an MCP call the tool may be invoked by the call). In some embodiments, LLM 110 can generate the at least one structured call in response to at least one system prompt instruction. For example, LLM 110 may be configured to construct a JSON or other structured object with parameters that can perform the action for an MCP call. The following are three example MCP calls that may be used, although it should be understood that other MCP calls or other structured calls may be possible in some embodiments.

In a first example MCP call, LLM 110 may cause a new result node to be stored. An example JSON for this task may be as follows:

```
{
    "type":"call_tool",
    "name":"upsert_node",
    "arguments":{
        "id":"result::ac91"
        "type":"result",
        "title":"Vendor A quote"
        "content":"Same-day 4-6 pm; est. $280.",
        "source":"tool:price_scout@1.8.2",
        "confidence":0.74,
        "timestamp":"2025-10-08T10:07:55Z",
        "metadata":{
            "provenance":{"tool":"price_scout","inputs":
                {"zip":"94107" },"runtime_ms":842},
            "evidence":{"raw":{"slot":"2025-10-08T16:00-
                18:00","fees":{"travel":140,"labor_est":
                140}}},
            "quality_score":0.78,
            "satisfies":[{"goal_id":"goal::7b3f","criterion-
                _metric":"quote_total","check":"pass" }],
            "flags":{"contradiction":false}
        },
        "tags":["result","quote"]
    }
}
```

In a second example MCP call, LLM 110 may link a result to a goal. An example JSON for this task may be as follows:

```
{
    "type":"call_tool",
    "name":"upsert_edge",
    "arguments":{
        "id":"edge::e01"
        "from":"result::ac91"
        "to":"goal::7b3f",
        "relation":"supports",
        "description":"Quote within budget criterion.",
        "confidence":0.81,
        "timestamp":"2025-10-08T10:08:02Z",
    "metadata":{"criteria_refs":[{"goal_id":"goal::7b3f",
        "metric":"quote_total" }],"direction":"for ward" }
    }
}
```

In a third example MCP call, LLM 110 may indicate backward reflection from a goal. An example JSON for this task may be as follows:

```
{
    "type":"call_tool",
    "name":"query_graph",
    "arguments":{
        "mode":"by_goal",
        "goal_id":"goal::7b3f",
        "include_relations":["depends_on",    "contradicts",
            "supports"],
        "depth":3
    }
}
```

Figure 4:
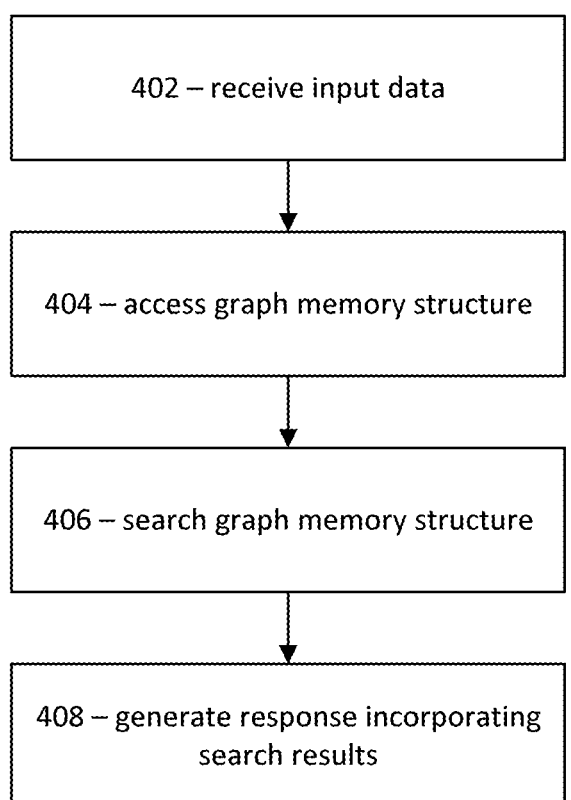
FIG. 4 shows an example dynamic graph access process according to some embodiments of the disclosure.

FIG. 4 shows an example dynamic graph access process 400 according to some embodiments of the disclosure. In some embodiments, system 100 may perform process 400 to access data in graph memory 120 and/or generate LLM 110 responses using such data. For example, system 100 can perform process 400 to facilitate user/LLM 110 interactions in the example conversation of FIG. 2 and similar conversations and/or use cases. Thus, LLM 110 can generate at least one additional response incorporating data stored in the graph memory structure of graph memory 120, for example as entered by process 300 described above.

At 402, system 100 can receive input data. For example, client 10 can present a UI providing a field or other interface element through which a user can input data to be processed by LLM 110. In some embodiments, client 10 can provide a chat-based UI configured to receive user input data and/or data facilitating display of such a UI by client 10. Client 10 can display the UI to a user, and the user can enter data using the UI by entering text into a field, speaking into a microphone, uploading a document, and/or other options. LLM 110 can receive the user input data entered by the user through the UI.

At 404, system 100 can access graph memory structure 120 and, at 406, system 100 can search graph memory 120. As discussed above, graph memory 120 may have a graph memory structure comprising at least two nodes and at least one edge linking the at least two nodes, wherein each node of the at least two nodes represents a respective interaction between LLM 110 and a user, and each edge of the at least one edge represents a respective relationship between the interactions. LLM 110 may be able to access graph memory 120 through one or more API and/or MCP calls, for example. LLM 110 can search the graph memory structure for information associated with at least a portion of the input data and obtain a search result comprising at least one of the at least two nodes and the at least one edge. In response to receiving a search command from LLM 110, graph memory 120 may perform the requested search and return search results.

LLM 110 may perform the accessing and/or searching in response to at least one system prompt instruction. For example, the system prompt can include instructions requiring LLM 110 to pick search tokens for graph memory 120. The system prompt can include instructions requiring LLM 110 to use context information if available, such as active goal node (e.g., title/content/constraints/tags), latest user turn, nearby results/observations (e.g., titles/contents/provenance), and/or node fields such as content, type, source, confidence, timestamp, and/or edge type (e.g., supports, contradicts, depends_on, etc.). The system prompt can include instructions requiring LLM 110 to generate a specific object, such as exactly one JSON object with three arrays (e.g., tokens.must, tokens.should, tokens.exclude) that the retriever will use in a graph search and not include prose. The system prompt can include instructions requiring LLM 110 to produce an output according to a strict format (e.g., {"tokens": "must": [" . . . "], "should": [" . . . "], "exclude": [" . . . "]}}." The system prompt can include instructions requiring LLM 110 to use one or more rules to choose tokens, such as the following example rules:

1) Extract candidates from: goal title/content+constraints/tags (e.g., dates, budgets, SLAs), current user turn, recent results/observations (tool/API names from provenance count too).
2) Keep signal, drop fluff: keep numbers, currency, times, dates, IDs (e.g., "$300", "4-6 pm", "2025-10-08"), lowercase+lemmatize; remove stopwords and vague words ("thing", "info").
3) Expand lightly: add 1-2 common synonyms or abbreviations per core concept if they materially help recall.
4) Prioritize and trim: prefer tokens close to the active goal, more recent timestamps, higher-confidence nodes; if planning/verification, bias tokens that relate to supports/depends_on; if resolving disputes, bias contradicts-related terms.

5) Limits: tokens.must: 3-6 high-precision terms (1-3 words each), tokens.should: 2-6 recall boosters (1-3 words each), tokens.exclude: 0-4 negatives (e.g., "cancelled", irrelevant dates).

Searching may be performed according to one or more techniques. For example, in some embodiments, LLM 110 can send at least one structured call to graph memory 120, and graph memory 120 may be configured to search at least a portion of data included in the at least one structured call according to at least one instruction in the at least one structured call. The at least one structured call may be or may include at least one of an API call and a MCP call, for example.

In some embodiments, LLM 110 can generate the at least one structured call and/or invoking at least one tool in response to at least one system prompt instruction. For example, the system prompt can include instructions requiring LLM 110 to produce exactly one tool call to query graph memory 120. The system prompt can include instructions requiring LLM 110 to use information about the graph memory structure to produce the call, where information may include statements indicating that nodes carry content, type, source, confidence, and/or timestamp (plus metadata/tags); edges are typed (e.g., supports, contradicts, depends_on, temporal, etc.) and include confidence+timestamp; and/or that searches start from a goal and look for dependencies, contradictions, and/or supporting evidence. The system prompt can include instructions requiring LLM 110 to produce an output based on a template structure (e.g., {"type":"call_tool", "name":"query_graph", "arguments": {"mode":"by_goal", "goal_id":"<goal::<id>>", "include_relations":[<see step 1>], "depth": <21314>, "node_types": ["result","observation"], "time_window": {"from": "<ISO8601>Z","to":null}, "tokens": {"must":[ ], "should":[ ], "exclude":[ ]}}}." The system prompt can include instructions requiring LLM 110 to use one or more rules to build the query, such as the following example rules:

1) If an active goal id is present, use: mode="by_goal"; goal_id=that id; include_relations: verifying a goal→ ["depends_on","supports"], resolving a conflict→ ["contradicts"], general exploration (default)→["depends_on","contradicts","supports"], depth: 3 (use 2 for strict checks; 4 if evidence is sparse).
2) Optional filters (include only if needed) node_types: ["result","observation"]; time_window: {"from": "<ISO8601>Z","to":null}; tokens: {"must":[ . . . ], "should":[ . . . ], "exclude":[ . . . ]}.
3) Output format (STRICT): a single JSON object shaped as a tool call. No prose, no explanation—just the JSON. At 408, system 100 can generate a response incorporating the results of the search performed at 406. For example, LLM 110 may generate a response to the input data, which may include incorporating data from the search result into the response. System 100 can send the response to client 10, thereby providing the response to the user.

Searching graph memory 120 may removes problems with linearity that can occur when LLM 110 searches its own internal record of a conversation. For example, as shown in FIG. 2, a user can ask for follow up information about a flight discussed earlier in the conversation ("Could you verify the flight is still available before booking?"). LLM 110 can search graph memory 120 for the flight and find the answer regardless of when the flight was initially discussed and what has happened since. For example, because the record is preserved better than in standard agentic systems, any intervening discussion of other flights or other topics is unlikely to affect the search results in the disclosed embodiments, whereas it may alter or even render useless the results when LLM 110 searches its own internal record. Also, the search in the disclosed embodiments can include metadata. For example, LLM 110 can request and receive a list of goals (e.g., nodes tagged with "goal" type), which can provide more relevant information than simply searching an LLM 110 internal record for "goals" or the like.

Figure 5:
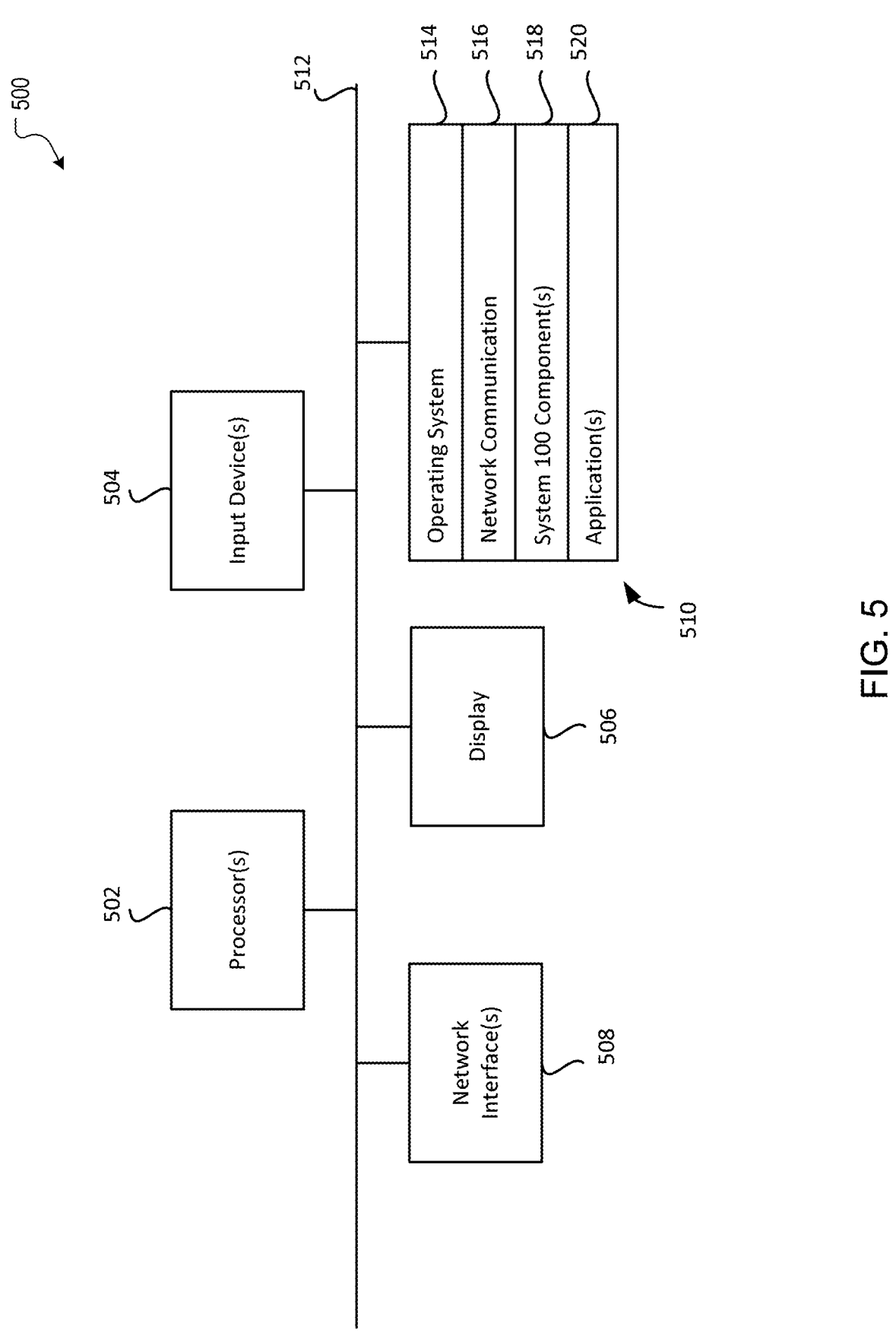
FIG. 5 shows an example computing device according to some embodiments of the disclosure.

FIG. 5 shows a computing device 500 according to some embodiments of the disclosure. For example, computing device 500 may function as one or more of client 10, system 100, and/or any portion(s) thereof, and/or multiple computing devices 500 may function as one or more of client 10, system 100, and/or any portion(s) thereof.

Computing device 500 may be implemented on any electronic device that runs software applications derived from compiled instructions, including without limitation personal computers, servers, smart phones, media players, electronic tablets, game consoles, email devices, etc. In some implementations, computing device 500 may include one or more processors 502, one or more input devices 504, one or more display devices 506, one or more network interfaces 508, and one or more computer-readable mediums 510. Each of these components may be coupled by bus 512, and in some embodiments, these components may be distributed among multiple physical locations and coupled by a network.

Display device 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device 504 may be any known input device technology, including but not limited to a keyboard (including a virtual keyboard), mouse, track ball, and touch-sensitive pad or display. Bus 512 may be any known internal or external bus technology, including but not limited to ISA, EISA, PCI, PCI Express, NuBus, USB, Serial ATA or FireWire. In some embodiments, some or all devices shown as coupled by bus 512 may not be coupled to one another by a physical bus, but by a network connection, for example. Computer-readable medium 510 may be any medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 510 may include various instructions 514 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an 1/O controller; and managing traffic on bus 512. Network communications instructions 516 may establish and maintain network connections (e.g., software for implementing communication protocols, such as TCP/IP, HTTP, Ethernet, telephony, etc.).

System 100 components 518 may include instructions for performing the processing described herein. For example, system 100 components 518 may provide instructions for implementing system 100 elements and/or performing processes 200, 300, and/or 400, and/or portions thereof. Application(s) 520 may be an application that uses or implements the outcome of processes described herein and/or other processes. In some embodiments, the various processes may also be implemented in operating system 514.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In some cases, instructions, as a whole or in part, may be in the form of prompts given to a large language model or other machine learning and/or artificial intelligence system. As those of ordinary skill in the art will appreciate, instructions in the form of prompts configure the system being prompted to perform a certain task programmatically. Even if the program is non-deterministic in nature, it is still a program being executed by a machine. As such, "prompt engineering" to configure prompts to achieve a desired computing result is considered herein as a form of implementing the described features by a computer program.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:

receiving, with a large language model (LLM) provided by at least one processor, input data;

processing, by the LLM, the input data, the processing comprising:

generating a response to the input data, generating a first memory entry corresponding to the input data, generating a second memory entry corresponding to the response, and generating a relationship between the first memory entry and the second memory entry, the relationship defining:

a dependency between the first memory entry and the second memory entry defining at least one effect by data within one of the first memory entry or the second memory entry on data within the other of the first memory entry or the second memory entry, and a direction of the dependency between the first memory entry and the second memory entry; and storing, by the at least one processor, the first memory entry as a first node in a graph memory structure, the second memory entry as a second node in the graph memory structure, and the relationship as an edge connecting the first node and the second node in the graph memory structure, wherein the at least one processor is configured to cause the LLM to generate at least one additional response incorporating data stored in the graph memory structure including at least one node and at least one edge.

2. The method of claim 1, wherein the processing comprises generating the first memory entry, the second memory entry, and the relationship in response to at least one system prompt instruction.

3. The method of claim 1, wherein the storing comprises:

sending at least one structured call to the at least one database; and wherein the at least one database is configured to store at least a portion of data included in the at least one structured call according to at least one instruction in the at least one structured call.

4. The method of claim 3, wherein the at least one structured call comprises at least one of an application programming interface (API) call and a model context protocol (MCP) call.

5. The method of claim 3, further comprising generating the at least one structured call by the LLM in response to at least one system prompt instruction.

6. The method of claim 3, further comprising invoking at least one tool by the LLM, the at least one tool performing processing comprising:

generating the at least one structured call to at least one database; and performing the sending of the at least one structured call to the at least one database.

7. A method comprising:

receiving, with a large language model (LLM) provided by at least one processor, input data;

processing, by the LLM, the input data, the processing comprising:

accessing a graph memory structure comprising at least two nodes and at least one edge linking the at least two nodes, wherein each node of the at least two nodes represents a respective interaction between the LLM and a user, and each edge of the at least one edge represents a respective relationship between the interactions, searching the graph memory structure for information associated with at least a portion of the input data and obtaining a search result comprising extracted data from at least one of a first memory entry in the graph memory structure corresponding to a first one of the at least two nodes and a second memory entry in the graph memory structure corresponding to a second one of the at least two nodes and an extracted relationship stored in the graph memory structure and associated with the at least one edge, the relationship defining:

a dependency between the first memory entry and the second memory entry defining at least one effect by data within one of the first memory entry or the second memory entry on data within the other of the first memory entry or the second memory entry, and a direction of the dependency between the first memory entry and the second memory entry, and generating a response to the input data, the generating comprising incorporating data from the search result into the response; and providing, by the at least one processor, the response to the user.

8. The method of claim 7, wherein the accessing and the searching are performed in response to at least one system prompt instruction.

9. The method of claim 7, further comprising:

generating, by the LLM a first memory entry corresponding to the input data;

generating, by the LLM, a second memory entry corresponding to the response;

generating, by the LLM, a relationship between the first memory entry and the second memory entry; and storing, by the at least one processor, the first memory entry as a first node in the graph memory structure, the second memory entry as a second node in the graph memory structure, and the relationship as an edge connecting the first node and the second node in the graph memory structure.

10. The method of claim 9, wherein the first memory entry, the second memory entry, and the relationship are generated in response to at least one system prompt instruction.

11. The method of claim 9, wherein the storing comprises:

sending at least one structured call to the at least one database; and wherein the at least one database is configured to store at least a portion of data included in the at least one structured call according to at least one instruction in the at least one structured call.

12. The method of claim 11, wherein the at least one structured call comprises at least one of an application programming interface (API) call and a model context protocol (MCP) call.

13. The method of claim 11, further comprising generating the at least one structured call by the LLM in response to at least one system prompt instruction.

14. The method of claim 11, further comprising invoking at least one tool by the LLM, the at least one tool performing processing comprising:

generating the at least one structured call to at least one database; and performing the sending of the at least one structured call to the at least one database.

15. The method of claim 7, wherein at least one of the accessing and the searching comprises:

sending at least one structured call to the at least one database; and wherein the at least one database is configured to return data according to at least one instruction in the at least one structured call.

16. The method of claim 15, wherein the at least one structured call comprises at least one of an application programming interface (API) call and a model context protocol (MCP) call.

* * * * *